United States Patent [19]

Claborn

[11] Patent Number: 4,981,012
[45] Date of Patent: Jan. 1, 1991

[54] APPARATUS FOR CONVERTING A GAS-POWERED FLEXIBLE LINE TRIMMER FOR USE AS A LAWN EDGER

[75] Inventor: Morris W. Claborn, Dallas, Tex.

[73] Assignee: Wedger, Inc., Dallas, Tex.

[21] Appl. No.: 211,049

[22] Filed: Jun. 24, 1988

[51] Int. Cl.⁵ .............................................. A01D 34/67
[52] U.S. Cl. ...................................... 56/16.9; 56/17.1; 56/17.5
[58] Field of Search ............... 56/16.7, 17.2, 16.9, 56/17.1, 17.5, 17.4; 172/17; 280/293, 767

[56] References Cited

U.S. PATENT DOCUMENTS

| | | | |
|---|---|---|---|
| 2,672,002 | 3/1954 | Nelson | 56/16.9 |
| 3,587,749 | 6/1971 | Sauer | 56/17.5 |
| 3,977,078 | 8/1976 | Pittinger, Jr. | 56/16.9 X |
| 4,182,100 | 1/1980 | Letter | 56/12.7 |
| 4,205,439 | 6/1980 | Sweet | 56/12.7 |
| 4,224,784 | 9/1980 | Hansen et al. | 56/16.9 |
| 4,287,709 | 9/1981 | Lowry et al. | 56/16.9 |
| 4,343,139 | 8/1982 | Lowry et al. | 56/17.5 |
| 4,364,435 | 12/1982 | Tuggle et al. | 56/17.2 |
| 4,389,836 | 6/1983 | Lowry et al. | 56/12.7 |
| 4,411,126 | 10/1983 | Lowry et al. | 56/12.7 |
| 4,442,659 | 4/1984 | Enbusk | 56/12.7 |
| 4,512,143 | 3/1985 | Jimenez | 56/16.7 |
| 4,531,350 | 7/1985 | Huthmacher | 56/17.5 |
| 4,615,534 | 10/1986 | Blain | 280/767 X |
| 4,679,385 | 7/1987 | Carmine | 56/16.9 |
| 4,712,363 | 9/1986 | Claborn | 56/16.7 |
| 4,829,755 | 5/1989 | Nance | 56/17.1 |

*Primary Examiner*—Ramon S. Britts
*Assistant Examiner*—Matthew Smith
*Attorney, Agent, or Firm*—Daniel V. Thompson

[57] ABSTRACT

An apparatus is provided for conversion of a gas-powered flexible line trimmer for use as a lawn edger by attachment of an extendable plate and wheel to a cylindrical trimmer boom, said plate and wheel acting as a support for maintaining position and orientation of a trimmer cutting path.

7 Claims, 3 Drawing Sheets

APPARATUS FOR CONVERTING A GAS-POWERED FLEXIBLE LINE TRIMMER FOR USE AS A LAWN EDGER

TECHNICAL FIELD

The present invention relates to an apparatus for converting a flexible line trimmer for use as a lawn edger by attaching a single-wheeled member to the trimmer.

BACKGROUND ART

Hand-held flexible line trimmers are light tools used for maintenance of lawns. Lawns regular in height and uniformly trimmed are desirable in today's society. Presently, in order to achieve the quality yard desired, several pieces of yard equipment must be employed, i.e., mowers, edgers, trimmers, etc. No single machine capable of performing all yard functions exists on the market today. Current machinery has existed without substantial design change for a substantial period of time, thus inferring that with regard to basic lawn equipment optimal designs have been reached. Consequently, a need exists for adapting or converting existing designs so as to perform several lawn maintenance functions, thereby minimizing the need for several pieces of lawn equipment and thus reducing cost of maintenance for the general home owning public.

Gas powered and electric-powered flexible line trimmers vary greatly in overall design and use. Electric trimmers, as shown in my prior U.S. Pat. No. 4,712,363, have a trimmer head incorporating a relatively heavy electric drive motor and housing. The weight of the electric-powered trimmer is concentrated at the head. Gas powered trimmers, in contrast, have the gas engine mounted at the end of a boom opposite the trimmer head, with the carrying handles located at approximately the balance point.

Further, the prior art includes the device shown in U.S Pat. No. 4,512,143 to Jimenez. Jimenez teaches a carriage for line trimmers having a frame resting on tubular runners which act as skids. The trimmer attaches to the frame and the skids provide a reference to the ground providing a uniform cutting path height for mowing a lawn.

Complete pieces of lawn equipment are taught by U.S. Pat. No. 4,364,435 to Tuggle et al. and U.S. Pat. No. 4,205,439 to Sweet. These patents teach a motor and handle, with a boom attached thereto supporting a head assembly having a cutting element. In each of these patents, the motor drives the cutting element through the boom.

The prior art also teaches dollies for converting flexible line trimmers for use as mowers and edgers. In particular, U.S. Pat. No. 4,442,659 to Enbusk teaches a dolly having a pair of wheels supporting a handle and pivotal mount to which the trimmer boom is attached. The mount pivots reacting to the control of the user as the operator moves the dolly forward. The operator controls orientation of the cutting path, consequently several degrees of freedom must be maintained by the operator, and thus, the desired uniform cutting path is difficult if not impossible to achieve. U.S. Pat. No. 4,182,100 to Letter teaches a elaborate three-wheeled frame on which the line trimmer rests. In Letter's initial configuration the trimmer acts as a mower. Further, the trimmer is attached to a pivoting handlebar and the extended trimmer boom attaches to the front of the frame. By applying pressure to the handlebars the trimmer may be rotated so as to provide a lawn edging cutting path. Once again, a multiple degree of freedom system necessitates that an inordinate amount of control to be exercised by the operator in order to maintain a uniform lawn edge.

Prior art also teaches a configuration for converting an electric power saw for use as a lawn edger. U.S. Pat. No. 3,587,749 to Sauer teaches a wheeled carriage and handle to which the power saw is attached. The blade of the power saw extends to one suitable for lawn edging.

The prior art further teaches a conversion device for attachment to a line trimmer. U.S. Pat. No. 4,224,784 to Hansen et al. teaches a device with two legs forming a triangular frame extending and providing axes for two wheels. The frame is attachable to the line trimmer by means of a mounting collar, but is configured to fit line trimmers having only specific dimensions. Hansen's device lacks universality, a highly advantageous feature for a device intended for use with pre-existing line trimmers.

Finally, my U.S. Pat. No. 4,712,363 discloses a two-wheeled apparatus for converting a flexible line trimmer for use as a lawn edger. My prior invention is optimal when used in conjunction with an electric trimmer, where the weight of the tool is concentrated at the head and the enhanced support and stability of two wheels are required. I have found, however, that the added complexity and cost required for the device is not optimal when used in conjunction with a gas-powered trimmer.

Consequently, a need presently exists for an attachable conversion apparatus which optimally will be utilizable with gas-powered flexible line trimmers. The apparatus will be lightweight and adapted to allow use of the trimmer in either a near-vertical or a horizontal mode without removing the apparatus. Finally, the apparatus should provide for trimming in a plane tilted away from the operator to remove the nuisance and hazard of flying debris.

SUMMARY OF THE INVENTION

The invention comprises a novel conversion apparatus for a gas-powered flexible line trimmer that includes a single-wheeled wheel-member and a dogleg-shaped mounting-member translatably and fixably attached to each other. The mounting-member includes means for engaging the cylindrical boom of a gas-powered trimmer.

BRIEF DESCRIPTION OF THE DRAWINGS

A more complete understanding of the invention and its advantages will be apparent from the Detailed Description taken in conjunction with the accompanying Drawings, in which.

DETAILED DESCRIPTION OF THE PREFERRED EMBODIMENT

Figure 1:
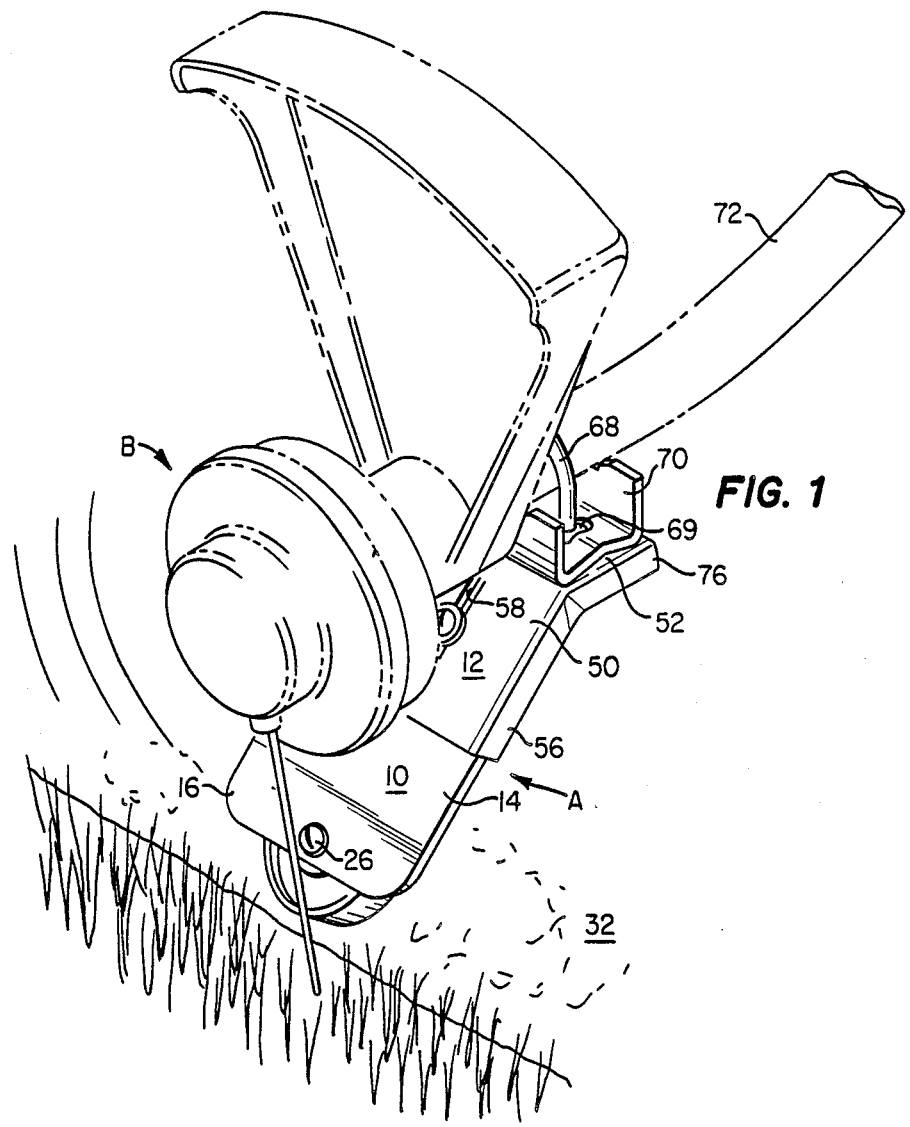
FIG. 1 is a perspective view of conversion apparatus constructed in accordance with the invention mounted to a gas-powered flexible line trimmer in the near-vertical edging mode.

Referring initially to FIGS. 1, 2, 3, and 4, the preferred embodiment of the present invention includes conversion apparatus A used in conjunction with gas-powered flexible line trimmer B. The two main components of conversion apparatus A are wheel-member 10 and mounting-member 12. Wheel-member 10 includes a planar sheet member 14 which is long in the direction illustrated by arrows 15 (FIG. 4) between first extremity 16 and second extremity 18. Sheet member 14 is wide in the direction illustrated by arrows 19 (FIG. 4) between first side edge 20 and second side edge 22. Preferably, wheel-member 10 is formed from a single piece of aluminum approximately ⅛ of an inch thick.

Figure 2:
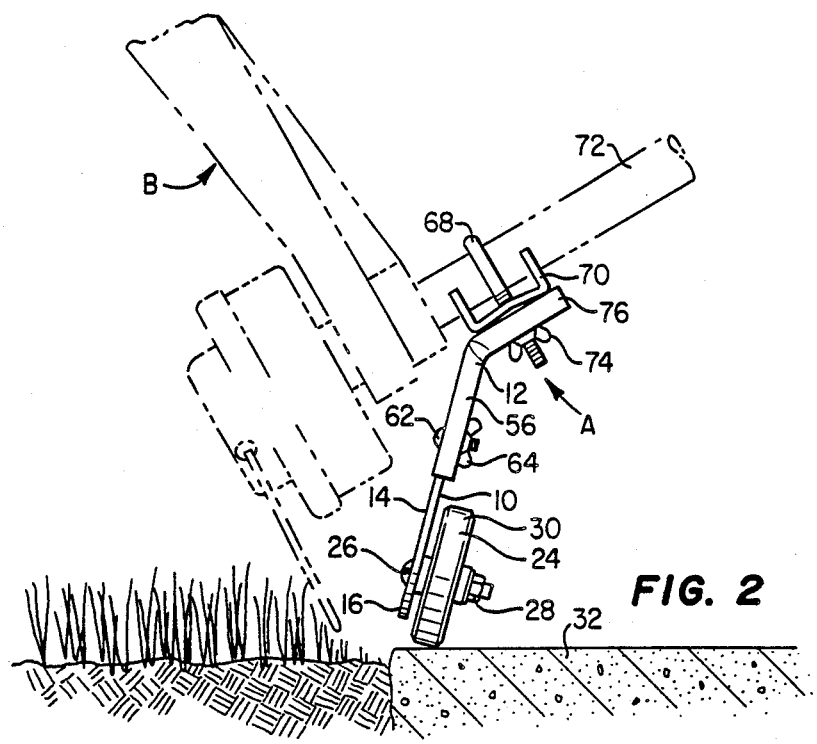
FIG. 2 is a side view of the conversion apparatus and trimmer of FIG. 1.

A single wheel 24 is rotatably supported by a machine screw 26 which serves as an axle for the wheel 24. Machine screw 26 extends through hole 23 in first extremity 16 and supports tubular bushing 27, which serves as a low friction bearing for wheel 24. A nut 28 serves to retain the wheel 24 in cooperation with machine screw 26 and bushing 27 extending prependicularly outwardly from the first extremity 16. Wheel 24 has a rolling surface 30 which extends beyond the first extremity 16 to contact sidewalk 32 as shown in FIGS. 1 and 2.

Figure 3:
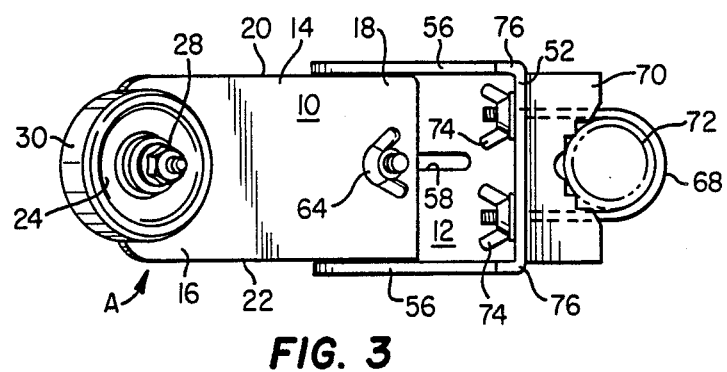
FIG. 3 is a bottom view of conversion apparatus constructed in accordance with the invention.

Mounting-member 12 is a dogleg-shaped member including a first planar sheet portion 50 and a second planar sheet portion 52 joined along a linear fold 54 to form an obtuse included angle therebetween. Preferably, mounting-member 12 is formed from a single sheet of aluminum approximately ⅛ of an inch thick, similar to wheel-member 10. First planar sheet portion 50 is of a longer dimension away from fold 54 than is second planar sheet portion 52. First planar sheet portion 50 includes planar side flanges 56 to closely interfit with first and second side edges 20 and 22, respectively. Preferably, side flanges 56 are folded at right angles to first planar sheet portion 50. First planar sheet portion 50 also includes an elongated slot 58. Slot 58 is centrally located in first planar sheet portion 50 and is elongated in a direction perpendicular to fold 54. Second extremity 18 of sheet member 14 includes a cylindrical hole 60 which registers with slot 58 when wheel-member 10 and mounting-member 12 are interfitted as best shown in FIGS. 3. A machine screw 62 extends through the registered slot 58 and hole 60 to translatably and fixably connect wheel-member 10 and mounting-member 12 together when secured with wing nut 64. It will be appreciated that the slot could be located in the wheel-member 10 and the hole located in the mounting-member 12 to equivalent function and effect.

Second planar sheet portion 52 includes a pair of identical elongated slots 66. Slots 66 are colinear in their elongated direction and parallel to fold 54. Slots 66 are centrally located in second planar sheet portion 52. A U-bolt 68 has threaded ends which extend through holes 69 in clamp member 70 and slots 66. The curvature of U-bolt 68 and dimensions of clamp member 70 are selected to interfit with boom 72 of a gas-powered flexible line trimmer. Wing nuts 74 enable the releasable clamping of boom 72 by way of U-bolt 68 and clamp member 70. Second planar sheet portion includes side flanges 76 folded at right angles therewith.

Figure 5:
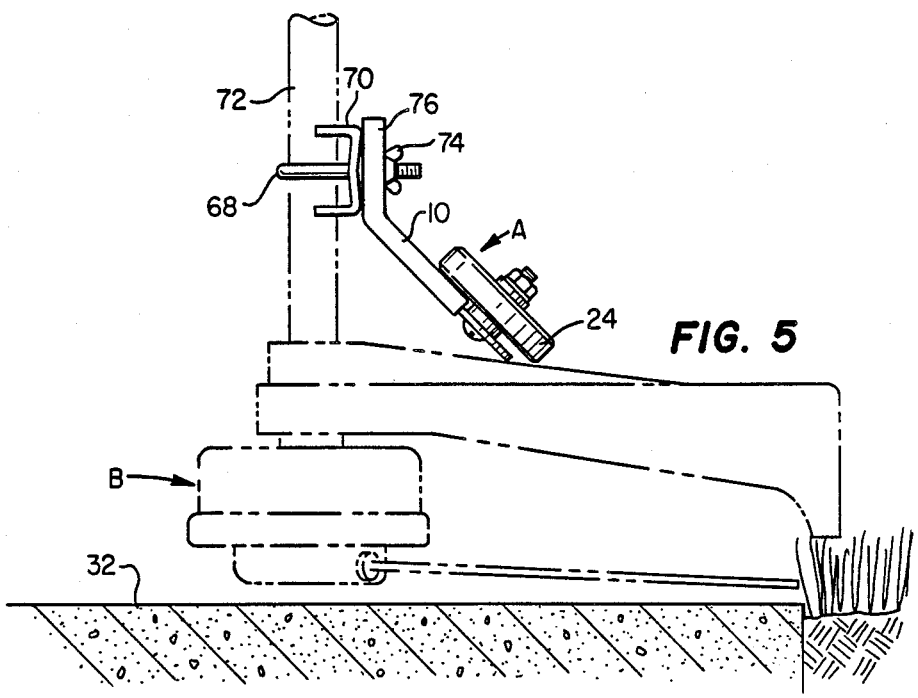
FIG. 5 is a view of the conversion apparatus of FIGS. 1 and 2 in a stowed position for use in the horizontal trimming mode.
Figure 4:
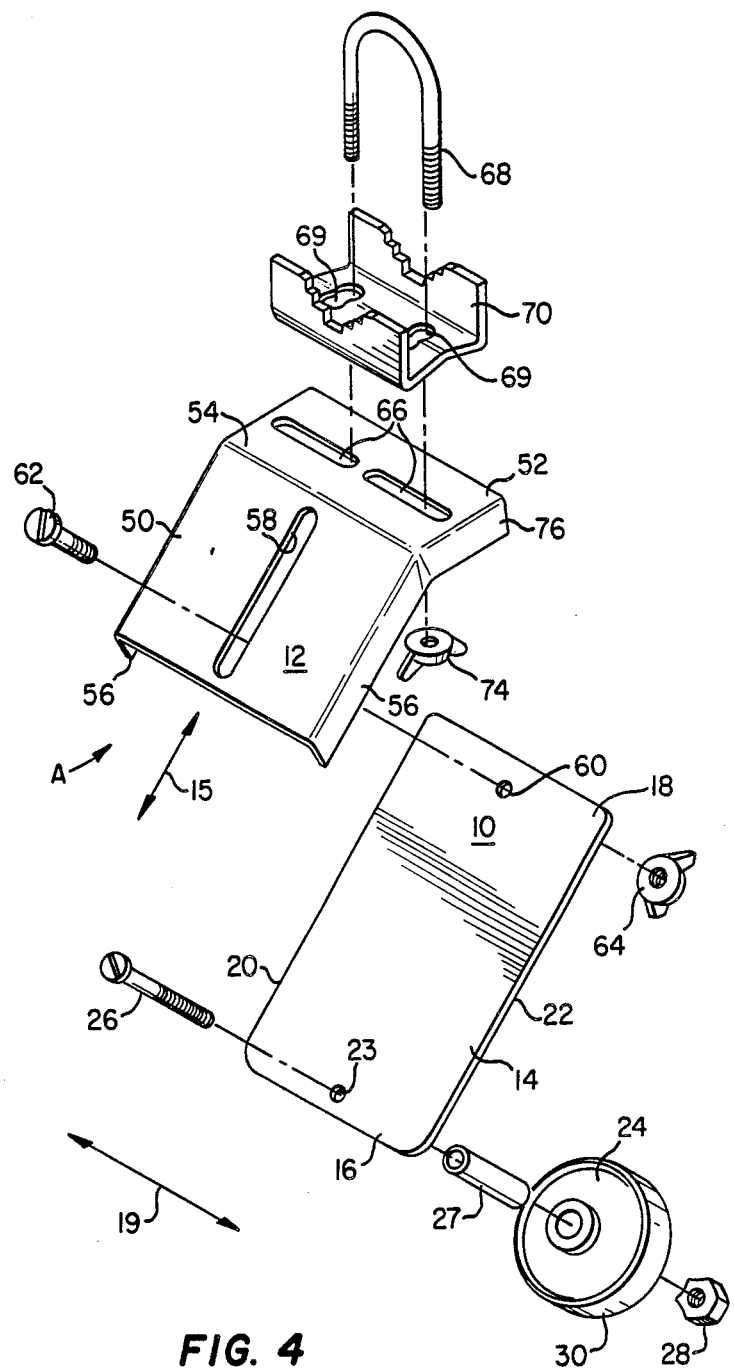
FIG. 4 is an exploded view of the conversion apparatus of FIG. 3.

In operation, the conversion apparatus A is attached to the boom of a gas-powered flexible line trimmer B by selecting the proper U-bolt 68 and clamp member 70 to engage the trimmer boom 72. Elongated slots 66 an second planar sheet portion 52 enable a wide range of usable boom diameters. Wing nuts 74 are tightened to fix mounting-member 12 with respect to the boom 72. The overall extension of wheel-member 10 may then be established by loosening wing nut 64 and translating wheel-member 10 relative mounting-member 12. Wheel-member 10 is confined for linear motion by side flanges 56 acting in close proximity to first and second side edges 20 and 22, respectively. Elongated slot 58 enables a range of wheel-member extension settings to suit the user. The trimmer is usable in the near-vertical mode shown in FIGS. 1 and 2 to trim the edge of a lawn along, for example, sidewalk 32. Wheel surface 30 supports the trimmer on the edge of the sidewalk 32, enabling the operator to obtain a uniform edge. If desired, the trimmer may be used in the horizontal mode, as shown in FIG. 5, without disturbing the position of the conversion apparatus with respect to boom 72. However, the operator may wish to temporarily loosen wing nuts 74 and rotate the apparatus around to the position shown in FIG. 5, where the apparatus will be out of the way for horizontal mode trimming in confined areas.

It can thus be seen that use of the gas-powered flexible trimmer in either near-vertical or horizontal mode can be readily accomplished without removing the conversion apparatus. In preferred form, where the apparatus is formed almost entirely of aluminum sheet, the apparatus is of minimal weight such that no substantial additional effort is required when using the trimmer in the horizontal mode. An infinite number of spatial relationships between the trimmer, apparatus and supporting pavement is enabled by the adjustability of the U-bolt/clamp member method of attachment to the trimmer boom as well as the adjustable extension of wheel-member 10 from mounting-member 12. Finally, use of the apparatus to accomplish near-vertical mode trimming such as sidewalk edging offers a substantial increase in safety over conventional edgers. When using the apparatus of the present invention, the user walks to the side of the trimmer and out of the path of flying debris. In contrast, regular edgers require the user to walk behind and in the path of the spinning edger blade and flying objects.

Having described the invention, it will be apparent to those skilled in the art that various modifications may be made therein without departing from the spirit and scope of the present invention as defined in the appended claims.

I claim:

1. An apparatus for converting a gas-powered flexible line trimmer having a boom for use as a lawn edger, comprising:

(a) a wheel-member having first and second extremities and at least one wheel rotatably fixed to and extending beyond said first extremity;

(b) a mounting-member having adjacent first and second portions;

(c) means for adjustably fastening the second extremity of the wheel-member to the first portion of the mounting-member, such that the relative positioning of the wheel-member and the mounting-member can be selectively established; and (d) means for adjustably mounting the second portion of the mounting-member to the boom of the trimmer, such that the relative positioning of the apparatus and trimmer can be selectively established.

2. An apparatus for converting a gas-powered flexible line trimmer having a boom for use as a lawn edger, comprising:
   (a) a wheel-member having first and second extremities and at least one wheel rotatably fixed to and extending beyond said first extremity;
   (b) a mounting-member having adjacent first and second portions;
   (c) means for adjustably fastening the second extremity of the wheel-member to the first portion of the mounting-member, such that the relative positioning of the wheel-member and the mounting-member can be selectively established;
   (d) means for adjustably mounting the second portion of the mounting-member to the boom of the trimmer, such that the relative positioning of the apparatus and trimmer can be selectively established; and
   (e) wherein the first and second portions of the mounting-member are planar and joined to one another at a linear fold to form an obtuse included angle therebetween.

3. The apparatus of claim 2 wherein the means for adjustably mounting includes a U-bolt for engaging the boom of the trimmer in cooperation with the second portion of the mounting-member.

4. The apparatus of claim 3 wherein the second portion of the mounting-member includes slots for receiving threaded ends of the U-bolt, and the slots are elongated to enable use of U-bolts of varied dimensions.

5. The apparatus of claim 2 wherein the means for adjustably fastening includes an elongated slot in the first portion of the mounting-member, a hole in the second extremity of the wheel-member being registered with the slot, and a disengagable fastener extending through the slot and hole.

6. The apparatus of claim 2 wherein the wheel-member includes a sheet member having first and second linear side edges, and the mounting-member first portion includes planar side flanges in close proximity to the side edges to constrain the wheel-member for linear relative movement.

7. An apparatus for converting a gas-powered flexible line trimmer for use as a lawn edger comprising:
   (a) a wheel-member including:
      a planar sheet member having first and second extremities in a first direction and having first and second linear side edges in a second direction perpendicular to the first direction;
      a single wheel rotatably attached to an axle extending perpendicularly outwardly from said first extremity of said sheet member, said wheel having a rolling surface extending beyond said first extremity; and
      a hole in said second extremity;
   (b) a dogleg-shaped mounting-member including:
      a first planar sheet portion having an elongated slot therein and planar side flanges in close proximity to said first and second side edges of said planar sheet member;
      a second planar sheet portion joined to said first planar sheet portion at a linear fold to form an obtuse included angle therebetween;
      said slot being centrally located in said first planar sheet portion and elongated in a direction perpendicular to said fold;
   (c) first adjustable fastener means cooperating with said elongated slot and said hole in said wheel-member second extremity for translatably and fixably connecting said wheel-member and said mounting-member, with said wheel-member being translatable relative said mounting-member in said first direction; and
   (d) second adjustable fastener means for mounting said mounting-member second planar sheet portion to a gas-powered flexible line trimmer boom.

* * * * *

UNITED STATES PATENT AND TRADEMARK OFFICE
CERTIFICATE OF CORRECTION

PATENT NO. : 4,981,012

DATED : January 1, 1991

INVENTOR(S) : Morris W. Claborn

It is certified that error appears in the above-identified patent and that said Letters Patent is hereby corrected as shown below:

Column 4, line 4, change "an" to -- in --.

Column 5, line 25, change "cf" to -- of --.

Signed and Sealed this

Thirtieth Day of June, 1992

*Attest:*

DOUGLAS B. COMER

*Attesting Officer*     *Acting Commissioner of Patents and Trademarks*